United States Patent [19]

Schmitter et al.

[11] 4,392,199

[45] Jul. 5, 1983

[54] FAULT-TOLERANT SYSTEM EMPLOYING MULTI-MICROCOMPUTERS USING TWO-OUT-OF-THREE MAJORITY DECISION

[75] Inventors: Ernst Schmitter; Paul Birzele; Klaus Buchmann; Gerhard Geitz; Bernhard Will; Wolfgang Beifuss, all of Munich, Fed. Rep. of Germany

[73] Assignee: Siemens Aktiengesellschaft, Berlin & Munich, Fed. Rep. of Germany

[21] Appl. No.: 191,908

[22] Filed: Sep. 29, 1980

[51] Int. Cl.³ .............................................. G06F 11/18
[52] U.S. Cl. ...................................... 364/200; 371/11; 371/36
[58] Field of Search ........................ 364/200 MS File; 371/36, 11

[56] References Cited

U.S. PATENT DOCUMENTS 3,735,356  5/1973  Yates ............................... 371/36 X

OTHER PUBLICATIONS

Wakerly, J. F., "Microcomputer Reliability Improvement Using Triple-Modular Redundancy," *Proc. IEEE*, vol. 64, No. 6, Jun. 1976, pp. 889–895.

*Primary Examiner*—Raulfe B. Zache
*Attorney, Agent, or Firm*—Hill, Van Santen, Steadman, Chiara & Simpson

[57] ABSTRACT

A Fault-tolerant computer architecture employs a plurality of microcomputers connected in a partially meshed ring. Three device controllers are connected to any of the microcomputers by means of a passive switch, and a fault in data transmission relative to one microcomputer is resolved by a two-out-of-three decision. A failure of one microcomputer is manifested by an adjacent microcomputer, so that the down microcomputer is omitted from furthwr task assignments.

6 Claims, 1 Drawing Figure

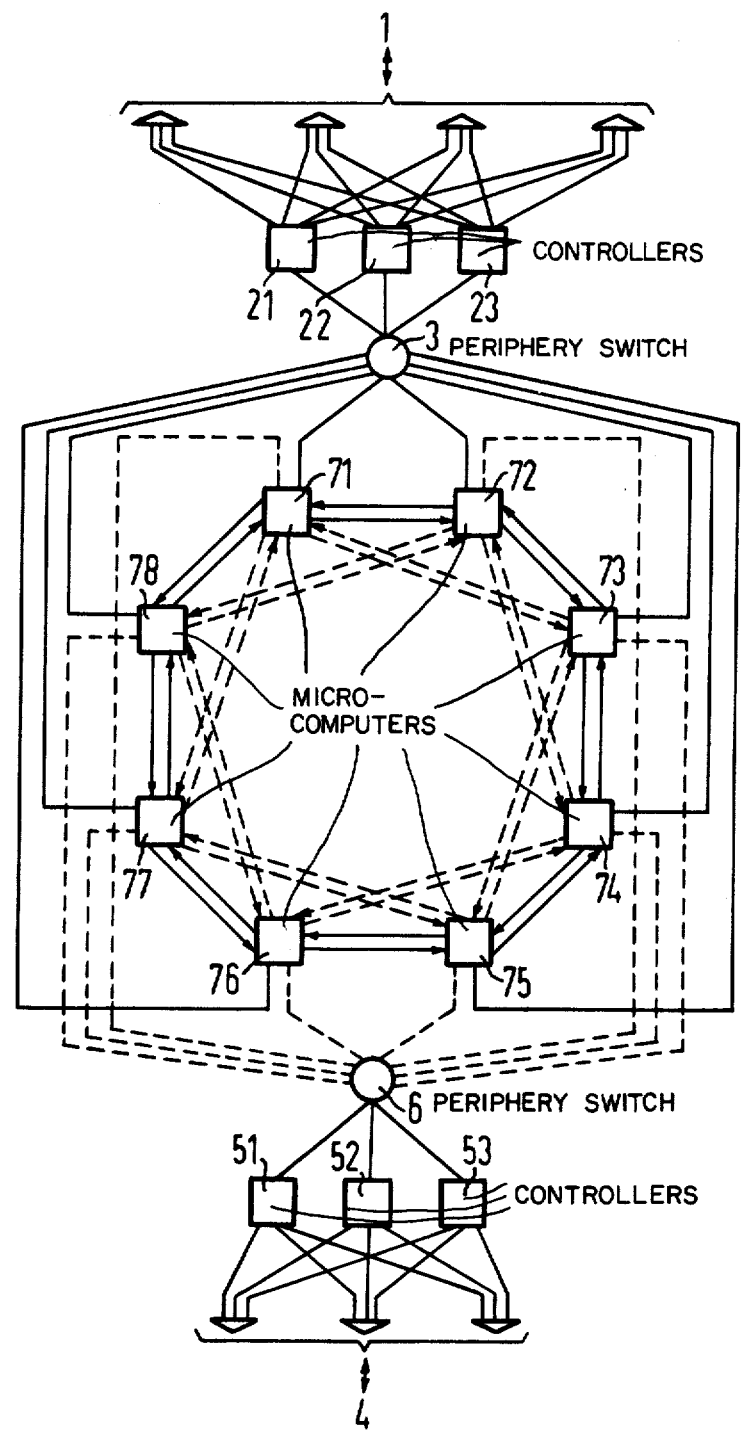

FAULT-TOLERANT SYSTEM EMPLOYING MULTI-MICROCOMPUTERS USING TWO-OUT-OF-THREE MAJORITY DECISION

BACKGROUND

1. Field of the Invention

The present invention relates to computer architecture and especially to fault-tolerant systems based on multi-microcomputer structures.

2. The Prior Art

It is known to employ systems incorporating two or more computers which can substitute for one another or can function as duplicates, and whose results are constantly monitored for equality. In case of the failure of one of the computers, a lack of equality results, the tasks undertaken in such computer control systems can be redistributed by means of a central change-over or switching mechanism. Systems of this type have the disadvantage that the central change-over mechanism is also subject to faults, and when this occurs, the overall system can be down.

There is, therefore, a need for a system in which the failure of one component of an entire system does not result in the overall system being down.

BRIEF DESCRIPTION OF THE INVENTION

It is a principal object of the present invention to provide a computer architecture which guarantees fault-tolerant processing.

A more specific object of the present invention is to provide a system in which the fault of one component of the system does not lead to the failure of the overall system.

The system of the present invention, except for interface devices provided for interfacing the computer architecture with the periphery and user level, the present invention does not employ specific alternative elements which are only used as needed, or duplicate elements which are only employed for the parallel execution of specific tasks.

The object of the present invention is achieved by means of a computer architecture incorporating multi-microcomputer structures in a fault-tolerant system, said microcomputers being capable of substituting for each other, and in which tasks are distributed on the basis of two out of three microcomputers being in agreement.

In one embodiment of the present invention, a plurality of microcomputers are arranged in a partially meshed ring in such a way that data exchange is possible between two microcomputers adjacent each other in the ring, and/or between any random microcomputer and its next-but-one microcomputer connected in the ring. Three device controllers are connected between the ring and the computer periphery, and three device controllers are connected between the ring and the computer user level. The device controllers and connectable to the input-output interfaces of all of the microcomputers by means of a passive periphery switch preferably comprising a single stage switching matrix. In this way, the respective configuration between the microcomputer ring and the periphery level, and between the microcomputer ring and the user level can be determined by means of a two-out-of-three majority decision on the occurrence of data transmission errors affecting one of three microcomputers.

The present invention achieves the advantage that when one of the computers is down or malfunctioning, the overall operation of the system is not disrupted. The system functions in a fault-tolerant manner until the simultaneous failure of two neighboring components, which has an extremely low probability. In this way the present invention achieves a high degree of reliability.

Other objects and advantages of the present invention will become manifest by an examination of the accompanying drawing and the following description.

BRIEF DESCRIPTION OF THE DRAWING

Reference will now be made to the drawing, which illustrates in block diagram form an exemplary embodiment of the present invention.

DESCRIPTION OF THE PREFERRED EMBODIMENT

The FIGURE shows a partially meshed ring incorporating microcomputers 71-78 for example 8080 or 8086 which are interconnected by solid and dashed lines indicating data exchange paths between individual microcomputers. As used herein, the term "partially meshed ring" refers to a structure in which a number of microcomputers 71-78 are interconnected to form a ring, with each microcomputer being additionally connected to some but not all of the other microcomputers. Adjacent microcomputers are interconnected by means of solid lines, for example, the lines between microcomputers 71 and 72. Dashed lines interconnect nonadjacent microcomputers, for example, the dashed lines between computers 71 and 73. As shown, the dashed lines interconnect each of the computers with the computers located in the ring two units away, in either direction. Such a computer is referred to as a "next-but-one" computer. All input-output interfaces of the microcomputers 71-78 are connected by means of a periphery switch 3 to device controllers 21, 22 and 23, respectively. The switch 3 is preferably a single stage switching matrix. Similarly, the microcomputers are connected by means of a periphery switch 6 to device controllers 51, 52 and 53. The controllers 21-23, for example with floppy (8271), prints (8255), display (8275), and special interfaces, are connected to periphery lines 1 in such a manner that each periphery line is connected to each device controllers 21-23. Similarly, the device controllers 51-53, for example with console (8251), identification card (8255), function keyboard (8275) and interface, are connected to user lines at an interface 4 such that each controller 51-53 is connected to each user line.

The controllers 21-23, and 51-53 are arranged in triple combination to control the data flow between the central ring and the periphery, or between the central ring and the user level. In case of a fault, the fault is eliminated by means of a two-out-of-three majority decision. Individual tasks are distributable to any of the microcomputers of the ring. A failure of any microcomputer, for example, microcomputer 71, is registered by the microcomputer directly adjacent to it, such as microcomputer 72. The down microcomputer 71 can thereafter be by-passed in further task distribution, due to the partial meshing of the ring.

The device controllers 21-23 and 51-53 are preferably processor controlled.

In operation, any of the microcomputers 71-78 may execute a program which requires access to one of the device controllers 21, 22 or 23, associated with the periphery lines 1. If the desired peripheral line is available, the task is deposited at the appropriate controller, in the manner well known to those skilled in the art. If the desired peripheral line is not available, the task is placed in a Que, and performed after a task previously placed in the Que had been performed.

In case of a fault within one of the controllers 21-23, the microcomputer which is communicating with such controller detects the fault, and accesses the other two controllers for the purpose of determining whether two of the three controllers gives the same result. If so, the result acheived by two of the controllers is directed to the desired peripheral line 1.

The sequence of monitoring and performing a two-out-of-three decision is the same for the controllers 51-53 as described above for the controllers 21-23.

Fault recognition within the system is performed on three different levels. First, each of the individual microcomputers perform self diagnostic procedures periodically, so that each of the microcomputers can in some cases detect their own faults. Secondly, communication between two connected microcomputers is monitored, and test messages are transmitted periodically between two connected microcomputers for the purpose of fault determination. Thirdly, when one or more of the microcomputers is idle, it may be caused to carry out a task assigned to one of the other microcomputers, as a test of its functioning. Thus a fault in one of the microcomputers (as well as in one of the controllers) may be detected in a number of ways. Perferably the monitoring microcomputers, for each microcomputer being tested, is one of the microcomputers which lie adjacent thereto in the ring of microcomputers 71-78. In each case the two microcomputers on either side of a given microcomputer contain in their memories information required to construct redundancy tables for the purpose of reconfiguration of the system and restart, in the event of a failure or fault detection in any one of the microcomputers.

The two-out-of-three decision may be carried out when required, by performance of an inquiry algorithm in which three microcomputers communicate with each other to compare the results produced by each, so that only the result which has a two-out-of-three agreement is relayed on through the appropriate switch 3 or 6.

It is apparent that various additions and modifications may be made in the apparatus illustrated in the drawing without departing from the essential features of novelty thereof, which are intended to be defined and secured by the appended claims.

What is claimed is:

1. A fault-tolerant system incorporating a plurality of microcomputers which can mutually substitute for each other and in which the principle of two-out-of-three decision is employed for control of the task distribution for the microcomputers, comprising:
  a partially meshed ring interconnecting said microcomputers;
  a plurality of data exchange paths, including data exchange paths between each two adjacent microcomputers in said ring and/or between any microcomputer in said ring and its next-but-one microcomputer;
  three device controllers being connected between said ring and a plurality of periphery lines, whereby data transmission errors may be resolved by a two-out-of-three majority decision, each of said device controllers being connected to each of said periphery lines;
  a passive periphery switch for connecting all of said device controllers to all of said microcomputers;
  a second set of three device controllers being connected between a plurality of user lines and said ring, each of the controllers of said second set being connectable to all of said user lines; and
  a second passive periphery switch for interconnecting all of the device controllers of said second set to all of said microcomputers.

2. A system according to claim 1, including means for distributing a plurality of tasks to said microcomputers in accordance with the requirements of such tasks.

3. A system according to claim 1, including means effective on failure of a microcomputer, for registering said failure in an adjacent microcomputer, whereby the down microcomputer may be by-passed in further task distribution.

4. A system according to claim 1, wherein said device controllers are processor controlled.

5. In a multi-processing system, the method of assuring fault-tolerant operation, comprising connecting a plurality of microcomputers in a partially meshed ring, with each of said microcomputers connected to two adjacent microcomputers and to at least one next-but-one microcomputer in said ring by means of data transfer paths, assigning three of said microcomputers to perform a data processing function, comparing the results of said performances, and transferring to an output the results in which at least two of said performances are in agreement.

6. The method according to claim 5, including the step of assigning three of said microcomputers to perform a communication function with a peripheral device, comparing the results of said communication performances, and undertaking a data transfer in which at least two of said performances are in agreement.

* * * * *